United States Patent

[11] 3,622,966

| [72] | Inventors | Charles Floyd George, Jr.<br>Plano, Tex.;<br>Howard A. Slack, Anchorage, Alaska;<br>Hugh Carroll Reeves, Plano, Tex. |
|------|-----------|---|
| [21] | Appl. No. | 55,714 |
| [22] | Filed | July 17, 1970 |
| [45] | Patented | Nov. 23, 1971 |
| [73] | Assignee | Atlantic Richfield Company<br>New York, N.Y.<br>Continuation-in-part of application Ser. No. 689,905, Dec. 12, 1967. This application July 17, 1970, Ser. No. 55,714 |

[54] WAVELET STANDARDIZATION
5 Claims, 19 Drawing Figs.

| [52] | U.S. Cl. | 340/15.5 |
|------|----------|----------|
| [51] | Int. Cl. | G01v 1/28 |
| [50] | Field of Search | 340/15.5 R |

[56] References Cited
UNITED STATES PATENTS

| 3,496,529 | 2/1970 | Anstey et al. | 340/15.5 R |
| 3,421,140 | 1/1969 | Kerns | 340/15.5 R |

Primary Examiner—Richard A. Farley
Assistant Examiner—N. Moskowitz
Attorneys—Blucher S. Tharp and Robert E. Lee, Jr.

ABSTRACT: Processes for improving seismic data whereby a plurality of seismograms is standardized to have the same generating wavelet. A reference seismogram is chosen and its autocorrelation is determined. The crosscorrelation between a first seismogram and the reference seismogram is determined. An operator is computed which transforms the crosscorrelation into the autocorrelation. The first seismogram and the operator are convolved to give the first seismogram the same wavelet as the reference seismogram. Additional seismograms can be standardized by this procedure using the same or a related reference seismogram.

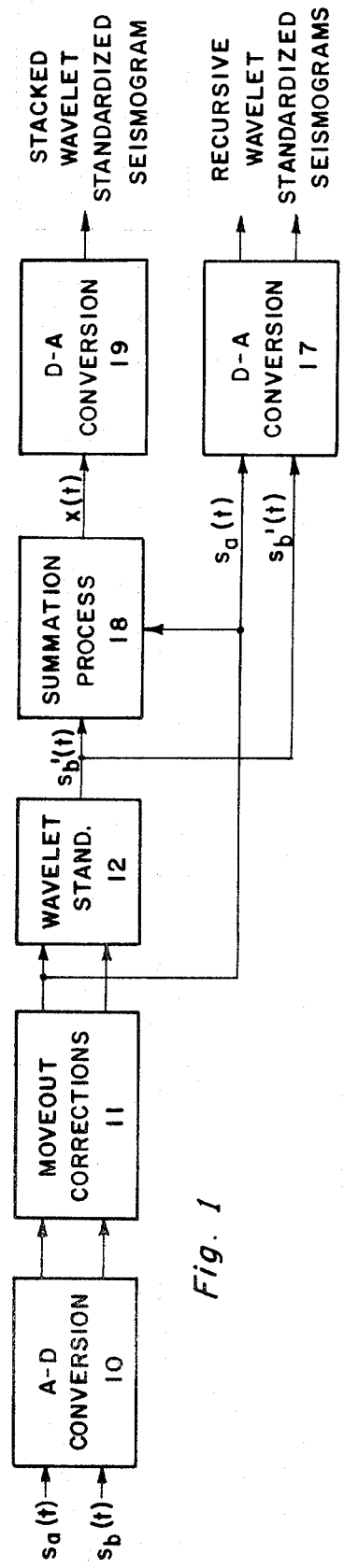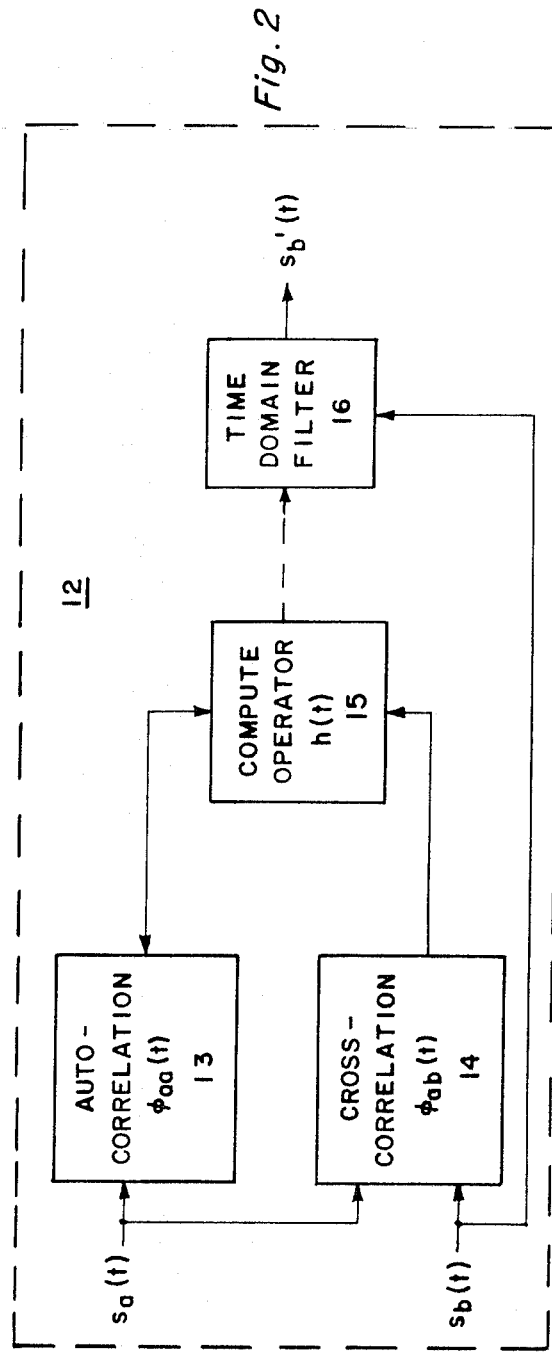

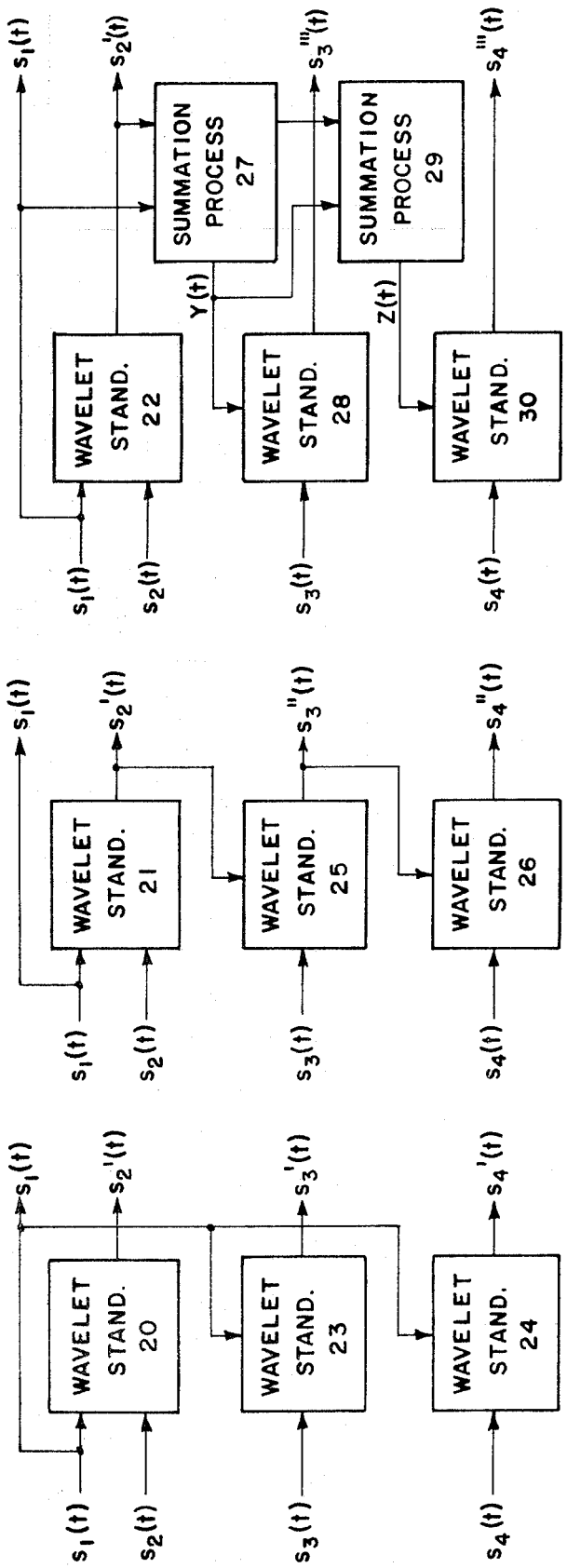

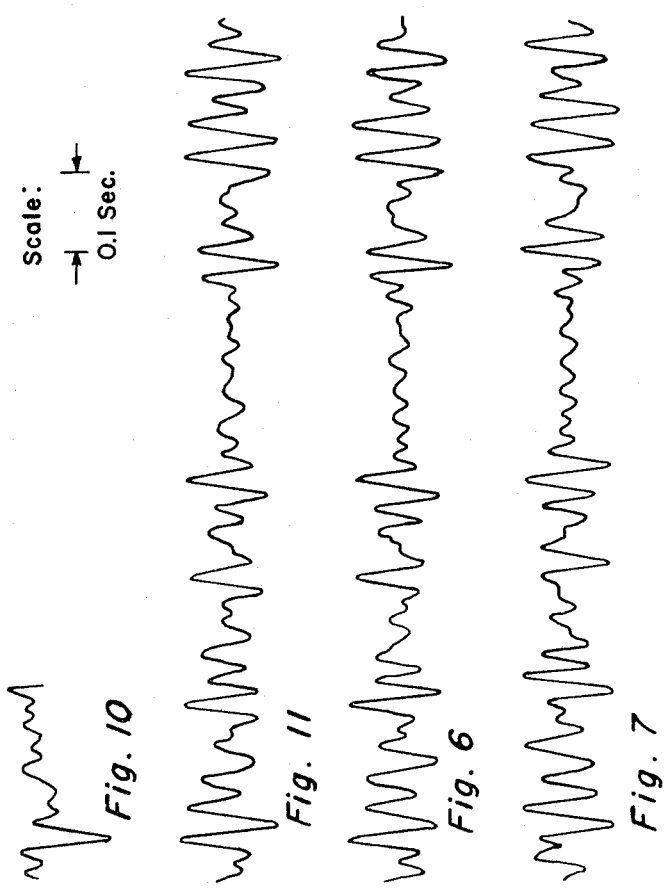

3,622,966
SHEET 4 OF 6
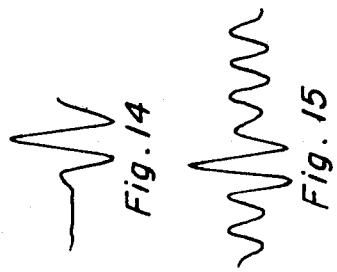
Fig. 14
Fig. 15
Fig. 16
Scale: 0.1 Sec.
Fig. 17
Fig. 12
Fig. 13
INVENTORS
Charles Floyd George, Jr.
Howard A. Slack
Hugh Carroll Reeves
BY *B. Luchers Sharp*
Attorney

WAVELET STANDARDIZATION

CROSS-REFERENCE TO RELATED APPLICATION

This application is a continuation-in-part of application Ser. No. 689,905, filed Dec. 12, 1967.

BACKGROUND OF THE INVENTION

The invention pertains to processing seismic data and particularly concerns standardizing a given seismogram so that it has the same generating wavelet as a reference seismogram.

A seismic cross section should be a filtered representation of the acoustic reflectivity of the earth's subsurface. Individual seismograms are generated by filtering a time series consisting of an earth reflectivity function with a wavelet. This filtering process is described mathematically by the term convolution.

When reflected signal energy exists on seismic records but does not line up from trace to trace, the result is, more often than not, a poor quality uninterpretable cross section. The cause usually lies with the down traveling wavelet of energy. The phase characteristics of this wavelet from shot to shot are either different to begin with or they become altered by the highly variable near-surface transmitting medium. Whatever the reason, as the generating wavelet varies, so varies the resulting seismogram.

Changes in a seismic section which are produced by differing wavelets rather than a changing reflectivity function are not truly representative of the subsurface. If by some process one could standardize the generating wavelets in a group of seismograms, the observed changes would then reflect with much greater reliability actual changes in the reflectivity of the earth. Standardization of waveform does not mean that the traces themselves must look alike but rather that their generating wavelets must resemble one another.

The success of many seismic data processes—particularly multitrace techniques such as stacking and velocity filtering—depends in the first instance on all seismic traces having the same waveform. As already noted, it is most difficult to gather meaningful information where changes across a seismic section may be the result of different wavelets being associated with the several traces, i.e. only when the observed changes represent differences in reflectivity is it possible to make reliable interpretations about the character and structure of the subsurface. Therefore, similarity in waveform is not only a necessary prerequisite for stacking and velocity filtering but it is also an important aid to visual interpretation of data.

The need for a process whereby a plurality of seismograms can be standardized to have the same generating wavelet is apparent. The process should be completely general and applicable to all time series regardless of how or where the individual traces were derived or of their relation to one another. Moreover, it is of prime importance that the wavelet standardization process be based solely upon a comparison of correlations of the seismograms being operated upon so that no special reference function or other external information is necessary.

To the best of Applicants' knowledge, no process of this sort is disclosed in the art and none existed until they developed the invention herein disclosed.

SUMMARY OF THE INVENTION

The present invention provides a new process for improving seismic data whereby a plurality of seismograms can be standardized to have the same generating wavelet.

Briefly, Applicants compare traces by autocorrelation and crosscorrelation and then design a filter so that, after application of this filter, all traces are equivalent to what they would have been like had they all originated from the same standard wavelet of primary energy. Assume that two seismograms, one and two, are produced by filtering the same reflection coefficient log with different wavelets. The autocorrelation of seismogram one provides information about the frequencies present in the generating wavelet for that seismogram. The crosscorrelation between seismograms one and two gives information about the relative magnitude and phase difference of the frequencies present in the generating wavelets for both seismograms. A digital operator or filter which transforms the crosscorrelation of seismograms one and two into the autocorrelation of seismogram one will, when convolved with seismogram two, produce a modified version of seismogram two having the same waveform shape as seismogram one.

If a third seismogram is to be standardized, this procedure is continued by selecting a suitable reference trace and then determining the autocorrelation of the third seismogram and the crosscorrelation of the reference trace and the third seismogram. Next, an operator or filter is computed which is capable of acting upon or converting the crosscorrelation of the third seismogram and the reference trace into the autocorrelation of the third seismogram. The third seismogram and the operator thus obtained are then convolved, i.e. the computed filter is applied to the third seismogram. The resulting output seismogram has the reflectivity function of the third seismogram but has the same generating wavelet as the reference trace.

Although the invention has been described in processes where only three seismograms are standardized with respect to one another, any desired number of seismograms can be operated upon or modified so that they all have essentially the same generating wavelet. Some variation in procedure is possible, however, depending upon the choice of reference traces. Probably the simplest process is to use the initial or first seismogram as a reference trace for standardizing every other seismogram of the group, i.e. the first seismogram is used as a reference trace for the second seismogram, the third seismogram, etc. Another process or scheme would be to employ the first seismogram as a reference trace for the second seismogram, but then use the resulting standardized second seismogram, as a reference trace for the third seismogram, etc. Still another process would be to use the first seismogram as a reference trace for the second seismogram and then combine the first seismogram and the resulting standardized second seismogram to give a summation seismogram which is subsequently used as a reference trace for the third seismogram; the resulting third standardized seismogram and the summation seismogram are combined and used as a reference for the next seismogram, etc.

No attempt will be made to discuss all the possible uses of wavelet standardization filtering. The data enhancement potential provided by this technique and its use in recursive wavelet standardization and wavelet standardized stacking are discussed in detail in the Preferred Embodiments.

One important aspect of this process will, however, be mentioned at this time—wavelet standardization eliminates the need for entering manual static corrections. Usually each trace must be visually examined in order to make appropriate static shifts. This procedure is very time-consuming and accounts for a significant part of the total processing time. Wavelet standardization filtering will not only do better statics than is possible manually, (because it takes into account phase changes other than simple time shifts) but will also increase throughout by doing on the digital computer in minutes a job which might require weeks if done by hand.

BRIEF DESCRIPTION OF THE DRAWINGS

FIG. 1 is a schematic drawing illustrating the basic operations involved in processing seismograms according to the invention.

FIG. 2 is a schematic drawing showing the steps involved in the wavelet standardization process of FIG. 1.

FIG. 3 is a schematic drawing showing a first process for standardizing a group of seismograms to give them a common generating wavelet.

FIG. 4 is a schematic drawing showing a second process for standardizing a group of seismograms to give them a common generating wavelet.

FIG. 5 is a schematic drawing showing a third process for standardizing a group of seismograms to give them a common generating wavelet.

FIG. 6 shows a first synthetic seismogram.

FIG. 7 shows a second synthetic seismogram.

FIG. 8 represents the autocorrelation of FIG. 6.

FIG. 9 represents the crosscorrelation of FIGS. 6 and 7.

FIG. 10 gives the operator which converts FIG. 9 into FIG. 8.

FIG. 11 is the result of convolving FIG. 10 and FIG. 7.

FIG. 12 shows a third synthetic seismogram.

FIG. 13 shows a fourth synthetic seismogram.

FIG. 14 represents the autocorrelation of FIG. 12.

FIG. 15 represents the crosscorrelation of FIGS. 12 and 13.

FIG. 16 gives the operator which converts FIG. 15 into FIG. 14.

FIG. 17 is the result of convolving FIG. 16 and FIG. 13.

DESCRIPTION OF THE PREFERRED EMBODIMENTS

Figure 18:
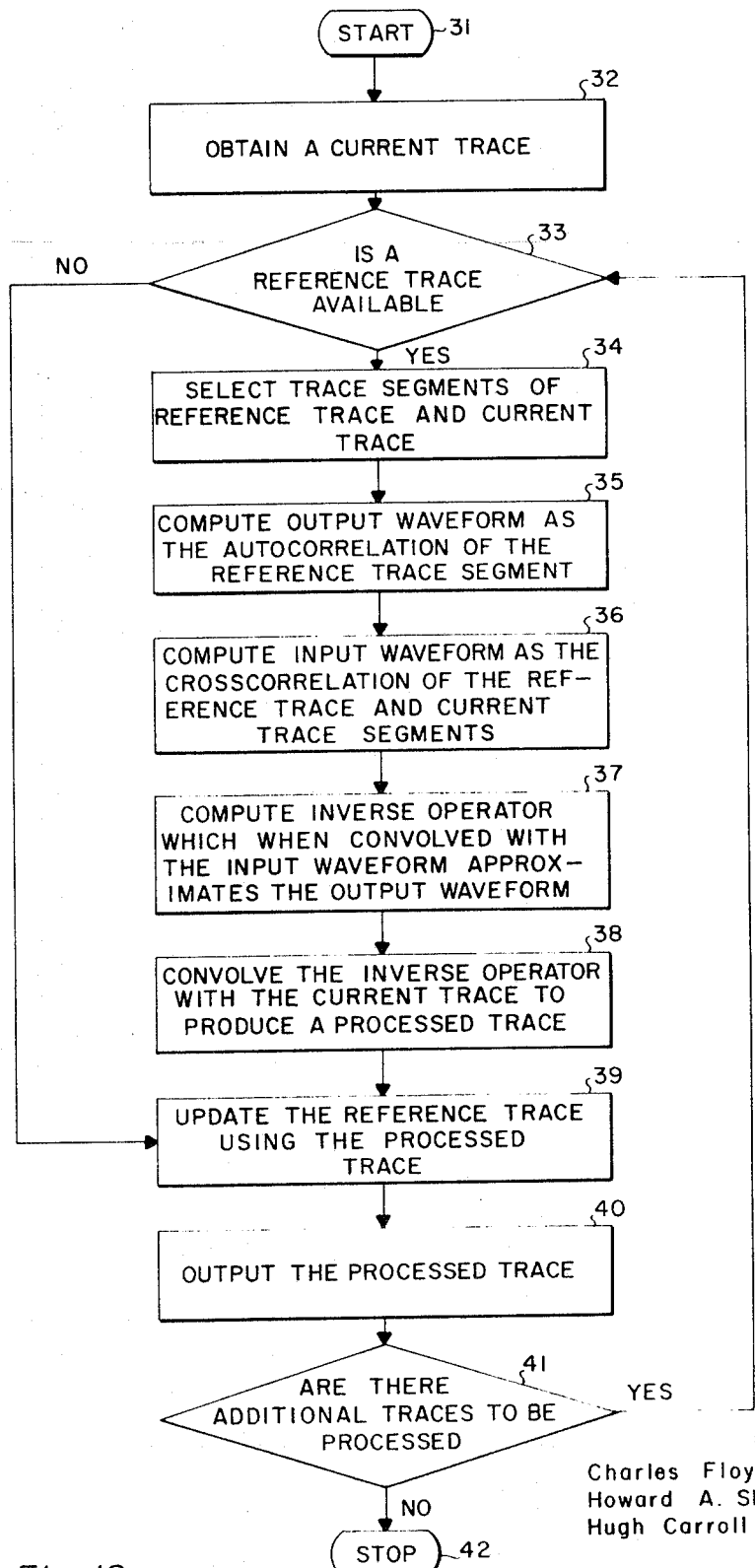
FIG. 18 is a flow diagram for performing the recursive wavelet standardization process on a digital computer.

The invention can best be understood by initially considering the theory upon which it is based.

Consider two seismograms $s_a(t)$ and $s_b(t)$ generated by convolving two different wavelets $w_a(t)$ and $w_b(t)$ with the same reflectivity function $r(t)$, $$s_a(t) = w_a(t) * r(t) \quad (1)$$
$$s_b(t) = w_b(t) * r(t) \quad (2)$$

where * denotes convolution.

Each frequency present in a time series and its relative phase are given by its Fourier transform or spectrum. Hence, the Fourier transforms of $s_a(t)$ and $s_b(t)$, $S_a(f)$ and $S_b(f)$, are equal to the products of wavelet spectra $W_a(f)$ and $W_b(f)$ and reflection coefficient spectrum $R(f)$, respectively.

$$S_a(f) = W_a(f) R(f) \quad (3)$$
$$S_b(f) = W_b(f) R(f) \quad (4)$$

The power density spectrum of a time series gives the relative contribution of each frequency present to total power while the cross power density spectrum of two time series is a measure of the average relative intensity of the product of their common frequency components. The power density spectrum of seismogram $s_a(t)$, $\Phi_{aa}(f)$, and the cross power density spectrum of seismograms $s_a(t)$ and $s_b(t)$, $\Phi_{ab}(f)$, are given below in terms of the complex spectra of the generating wavelets and the reflectivity coefficient:

$$\Phi_{aa}(f) = \overline{S}_a(f) S_a(f) = \overline{W}_a(f) \overline{R}(f) W_a(f) R(f) \quad (5)$$

$$\Phi_{ab}(f) = \overline{S}_a(f) S_b(f) = \overline{W}_a(f) \overline{R}(f) W_b(f) R(f) \quad (6)$$

where "—" signifies a complex conjugate.

Now consider a function $H(f)$, which, when multiplied by cross power density spectrum $\Phi_{ab}(f)$, will equal power density spectrum $\Phi_{aa}(f)$.

$$H(f) \Phi_{ab}(f) = \Phi_{aa}(f) \quad (7)$$

Rearranging:

$$H(f) = \Phi_{aa}(f) / \Phi_{ab}(f) \quad (8)$$

Substituting for $\Phi_{aa}(f)$ and $\Phi_{ab}(f)$, we have:

$$H(f) = \frac{\overline{W}_a(f) \overline{R}(f) W_a(f) R(f)}{\overline{W}_a(f) \overline{R}(f) W_b(f) R(f)} = \frac{W_a(f)}{W_b(f)} \quad (9)$$

The product of $H(f)$ and $S_b(f)$ reduces to $S_a(f)$.

$$H(f) S_b(f) = \frac{W_a(f)}{W_b(f)} W_b(f) R(f) = S_a(f) \quad (10)$$

Hence, function $H(f)$ changes $S_b(f)$ into $S_a(f)$ by changing both the amplitude and phase characteristics of $W_b(f)$ into those of $W_a(f)$.

The operations described above may be viewed in the time domain remembering that multiplication of frequency functions corresponds to convolution of their inverse transforms and that the power spectrums are the Fourier transforms of the correlation functions in the time domain. Thus, the inverse Fourier transforms of power density spectrum $\Phi_{aa}(f)$ and cross power density spectrum $\Phi_{ab}(f)$ are the autocorrelation $\Phi_{aa}(t)$ of seismogram $s_a(t)$ and the crosscorrelation $\Phi_{ab}(t)$ of seismograms $s_a(t)$ and $s_b(t)$, respectively. Wave-shaping filter $h(t)$, therefore, is the filter which when convolved with $\Phi_{ab}(t)$ produces $\Phi_{aa}(t)$.

$$h(t) * \Phi_{ab}(t) = \Phi_{aa}(t) \quad (11)$$

The same filter, $h(t)$, when convolved with $s_b(t)$, produces $s_a(t)$.

$$h(t) * s_b(t) = s_a(t) \quad (12)$$

In other words, filter or operator $h(t)$, when convolved with $s_b(t)$, changes generating wavelet $w_b(t)$ into wavelet $w_a(t)$ which generated $s_a(t)$. This is the basis by which wavelet standardization operators are computed in Applicants' process for improving seismic data.

Now, referring to the drawings, the basic operations involved in processing seismograms according to the present invention on a general purpose digital computer are shown in FIG. 1. Input seismograms $s_a(t)$ and $s_b(t)$ are converted into digital form, block 10, in order to simplify subsequent computations. Moveout (dynamic) corrections are applied in block 11 according to well-known procedures. The wavelet standardization process is applied in block 12 where seismogram $s_b(t)$ is standardized to have the same generating wavelet as seismogram $s_a(t)$. Output seismogram $s_b'(t)$ represents $s_b(t)$ modified to the form it would have had had it originated from the same wavelet of primary energy as $s_a(t)$.

The essential steps for performing the wavelet standardization process, block 12, are shown in FIG. 2. Seismogram $s_a(t)$ is selected as the starting or reference trace and its autocorrelation $\Phi_{aa}(t)$ is determined in block 13. The crosscorrelation $\Phi_{ab}(t)$ between seismogram $s_a(t)$ and reference seismogram $s_b(t)$ is determined in block 14. A filter or operator $h(t)$ is then computed (e.g. by the least squares method), block 15, which, when applied to crosscorrelation $\Phi_{ab}(t)$, produces autocorrelation $\Phi_{aa}(t)$. Next, seismogram $s_b(t)$ and operator $h(t)$ are convolved by time domain filter 16 to give the desired seismogram $s_b'(t)$.

Referring back to FIG. 1, alternative procedures can now be carried out, depending upon whether seismograms $s_a(t)$ and $s_b'(t)$ are to be individually displayed as recursive wavelet standardized seismograms or combined into a stacked wavelet standardized seismogram. According to the former procedure, seismograms $s_a(t)$ and $s_b'(t)$ are fed to block 17 where they are converted into analog form; by the latter procedure, they are combined or summed, as indicated by block 18, to provide composite seismogram $x(t)$ which is then fed to block 19 where it is converted into analog form.

Recursive wavelet standardization filtering is applied across a record section to consecutive adjacent traces. A starting or reference trace is selected; this may be the first trace of the section or a synthetic seismogram, if one is available. The autocorrelation of the reference trace and the crosscorrelation between the reference trace and the first seismogram to be standardized are determined. A filter is then computed which will, when applied to the crosscorrelation, produce the autocorrelation. This special filter is applied to the first seismogram to standardize it. The process then repeats itself using the same or a related reference trace until the last trace to be standardized has been processed.

One of the most significant parameters in computing a wavelet standardization filter is the trace segment to be used for the correlations. It is necessary to avoid including in these segments strong events which do not conform across the record section. Recursive wavelet standardization filtering works best when the trace segments used for correlations are short and centered around one strong event. If reflections within the selected interval are dipping and flattening or leveling of the horizon is desired, the trace segments used for correlation should all fall at the same absolute record time. On the other hand, if the observer wishes to preserve the dip, the trace segments used for correlation should follow a programmed path so that the event occurs at different record times from trace to trace.

Wavelet standardization stacking is similar to recursive wavelet standardization except that it generally deals only with common bounce traces and all the traces are stacked or combined. The objective here is to eliminate changes in generating wavelets between common bounce components. Stacking enhances data only if the signals reinforce and maximum reinforcement of signals is obtained only if the generating wavelets are all the same.

Basically, the same process is followed as was used in obtaining the recursive standardized traces. The seismogram with the least moveout (the one nearest the shot) is used as the initial reference and segments used for correlating the seismograms to be stacked are taken over the same absolute time interval for all traces. These selected intervals are generally somewhat wider than the intervals used in recursive wavelet standardization and may include several strong events. After all the traces have been standardized to have the same generating wavelet, they are combined into a single trace.

The wavelet standardization filters themselves are generally quite short in length in both the recursive and stacking standardization processes. The time origin is in the center of the filters, and they have arbitrary phase spectrums, depending upon the shape of the correlation functions.

Processes for standardizing and selecting reference traces for a group of seismograms such as $s_1(t)$, $s_2(t)$, $s_3(t)$, and $s_4(t)$ so that they all will have a common generating wavelet are shown in FIGS. 3, 4, and 5. Seismogram $s_1(t)$ is selected as the initial reference seismogram in each instance and seismogram $s_2(t)$ is standardized with respect thereto, blocks 20, 21, and 22, so that output seismogram $s_2'(t)$ has the same wavelet as $s_1(t)$. Now, however, differences in the wavelet standardization processes will become apparent. First, referring to FIG. 3, seismograms $s_3(t)$ and $s_4(t)$ are standardized, blocks 23 and 24, again using $s_1(t)$ as a reference trace. Output seismograms $s_3'(t)$ and $s_4'(t)$ obviously have the same generating wavelet as $s_1(t)$ or, for that matter, $s_2'(t)$. Next, referring to FIG. 4, seismogram $s_3(t)$ is standardized with respect to $s_2'(t)$, block 25, to produce modified seismogram $s_3''(t)$ which is then used in standardizing seismogram $s_4(t)$, block 26, to give modified seismogram $s_4'(t)$. It is readily apparent that seismograms $s_1(t)$, $s_2'(t)$, and $s_3''(t)$ and $s_4''(t)$ are all similar in form in that they are derived from the same wavelet. Finally, referring to FIG. 5, seismograms $s_1(t)$ and $s_2'(t)$ are added in block 27 to give summation seismogram $y(t)$. Seismogram $s_3(t)$ is then standardized, block 28, using $y(t)$ as a reference trace. Output seismogram $s_3'''(t)$ is combined with $y(t)$, block 29, to give summation seismogram $z(t)$ which is then used as a reference seismogram in standardizing seismogram $s_4(t)$, block 30. Again, it will be apparent that all the resulting seismograms, i.e. $s_1(t)$, $s_2'(t)$, and $s_3'''(t)$, and $s_4''''(t)$ have the same characteristic wavelet. (Each time two seismograms are added or combined, they are weighted so that all the seismograms included in the stack up to that time are weighted equally. Thus, in summation process 27 $s_1(t)$ and $s_2'(t)$ are given equal weighting and in summation process 29 $y(t)$ is given twice the weighting as $s_3'''(t)$ since $y(t)$ is comprised of two traces.)

Examples of the design and application of filters to standardize generating wavelets among a plurality of seismograms are given in FIGS. 6–17.

A first synthetic seismogram, FIG. 6, was computed from a velocity log run in an actual well by convolving its reflection coefficient log with a 50 c.p.s. window designed for a peak amplitude of 25 c.p.s. A second synthetic seismogram, FIG. 7, was obtained by inverting the seismogram of FIG. 6 and lagging it in time by 20 ms. Now, taking the first seismogram, FIG. 6, as a reference trace, we will standardize the second seismogram, FIG. 7, with respect thereto so that it has the same generating wavelet. According to the present invention, the autocorrelation of the first seismogram and the crosscorrelation of the second and first seismograms are determined; these are shown in FIGS. 8 and 9, respectively. Next a least squares operator, FIG. 10, is computed which transforms the crosscorrelation, FIG. 9, into the autocorrelation, FIG. 8. The operator, FIG. 10, is then convolved with the second seismogram, FIG. 7, producing the time series, FIG. 11 (which is the second seismogram, FIG. 7, inverted and shifted in time so that it has the same waveform shape as the first seismogram). The success of Applicants' wavelet standardization process is attested by the close resemblance between the standardized second seismogram, FIG. 11, and the reference seismogram, FIG. 6.

A third synthetic seismogram, FIG. 12, was computed by convolving the aforenoted reflection coefficient log with a 40 c.p.s. minimum phase wavelet having a peak amplitude at 20 c.p.s. A fourth synthetic seismogram, FIG. 13, was obtained by advancing the seismogram of FIG. 6 in time by 40 ms. Now, choosing the third seismogram, FIG. 12, as the reference trace, the fourth seismogram, FIG. 13, is standardized with respect thereto by taking the autocorrelation of the third seismogram and the crosscorrelation of the fourth and third seismograms. The autocorrelation and crosscorrelation are given in FIGS. 14 and 15, respectively. An operator, FIG. 16, is computed which transforms the crosscorrelation, FIG. 15, into the autocorrelation, FIG. 14. Convolving the fourth seismogram, FIG. 13, and the operator, FIG. 16, gives time series, FIG. 17. It will be seen that the fourth seismogram, FIG. 13, has been shifted in time and given the same waveform shape, FIG. 27, as the reference seismogram, FIG. 12.

Figure 19:
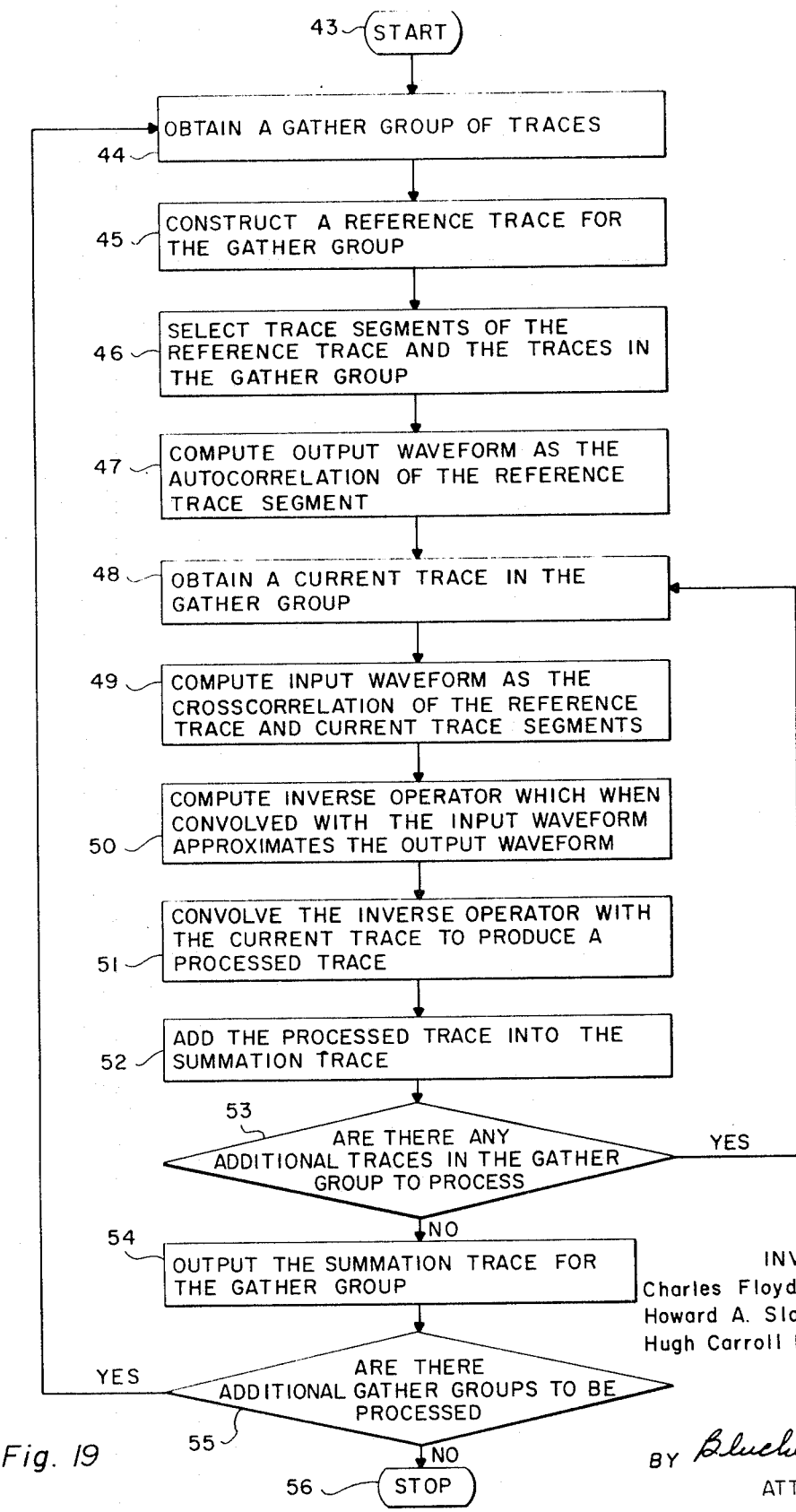
FIG. 19 is a flow diagram for performing the stacked wavelet standardization process on a digital computer.

Referring to FIGS. 18 and 19, flow diagrams are provided that will enable persons skilled in the art to write computer programs to practice the present invention.

FIG. 18 sets forth the fundamental computer processing steps for producing recursive wavelet standardized seismograms. It is assumed that all the seismograms which are to be operated upon have been digitized and entered in the storage bank of the computer. After initiation of the routine, block 31, the first step 32 is the selection of an individual trace (referred to as a "current trace") for standardization.

At the start of operations, i.e. when the first current trace is selected, no reference trace will be available and the NO loop is followed leading from block 33 to block 39. The first current trace is simply cycled through the system unchanged in order to serve as a reference trace for the second current trace. For the second and subsequent current traces, however, a reference trace will be available and the YES loop is followed from block 33 to 34 where trace segments are selected for both the reference trace and current trace.

The output waveform is computed, block 35, as the autocorrelation of the reference trace segment previously selected. Next, the input waveform is computed, block 36, as the crosscorrelation of the reference trace segment and the current trace segment. The inverse operator which when convolved with the input waveform approximates the output waveform can now be computed, block 37. When the inverse operator is determined, it is then convolved with the current trace, block 38, to produce a processed or standardized trace. It will be apparent that the processed trace is the current trace modified to have the same generating wavelet as the reference trace. Prior to operating the next current trace, the reference trace is updated, block 39, using the processed form of the last current trace. (This may be done as previously discussed in conjunction with FIG. 4.) If desired, the updating step can be deleted altogether and the same reference trace used for standardizing subsequent current traces. Each processed trace is outputed, block 40, prior to treating additional traces. If there are additional traces to process, the YES loop from block 41 to block 33 is followed and the aforesaid sequence of operations is repeated. If there are no additional traces to process, the NO loop is followed from block 41 to block 42 and the automatic computer routine is stopped.

FIG. 19 gives a computer flow diagram for stacking wavelet standardized seismograms. Again it is assumed that all the seismograms which are to be operated upon have previously been digitized and stored in the computer. The routine is started, block 43, with the first step 44 being obtaining a gather group of traces, i.e. selecting the traces which are to be stacked or combined. A reference trace for the gather group is constructed, block 45. The reference trace may simply be one of the traces in the gather or a combination of several traces. After the first run through the program, a summation trace will be obtained which can serve as a reference for the next trace in the gather (see FIG. 5 for further discussion). Next, trace segments of the reference trace and the traces in the gather group are selected, block 46. The output waveform is computed, block 47, as the autocorrelation of the reference trace segment. A trace (called a current trace) is then obtained from the gather group, block 48, and the input waveform is computed, block 49, as the crosscorrelation of the reference trace segment and the current trace segment. Next, the inverse operator which when convolved with the input waveform approximates the output waveform is computed, block 50. Convolving the inverse operator with the current trace, block 51, gives a processed trace which represents the current trace modified to have the same generating wavelet as the reference trace. The processed trace is then added or combined, block 52, into the existing summation trace, if any, to give a new summation trace. If there are additional traces in the original gather group to process, the YES loop is followed from block 53 to block 48 and operations given in blocks 48, 49, 50, 51 and 52 are repeated. When the last trace in the gather group has been processed, the final summation trace is outputed, block 54. If there are then additional gather groups of traces, the YES loop from block 55 is followed back to block 44 and the entire sequence of operations is repeated. Once all the gather groups have been treated, the NO loop from block 55 is followed to block 56 and the computer operations are automatically terminated.

What is claimed is:

1. An automatic machine performed process for improving seismic data whereby a seismogram of interest is standardized to have the same generating wavelet as a reference seismogram comprising
    a. determining the autocorrelation of the reference seismogram,
    b. determining the crosscorrelation of the seismogram of interest and the reference seismogram,
    c. computing an operator which converts the crosscorrelation of the seismogram of interest and the reference seismogram into the autocorrelation of the reference seismogram, and
    d. convolving the seismogram of interest with the operator.

2. An automatic machine implemented process for improving seismic data whereby a plurality of seismograms is standardized to have the same generating wavelet comprising
    a. selecting one of the seismograms as a reference and determining its autocorrelation,
    b. determining the crosscorrelation of a second seismogram and the reference seismogram,
    c. computing an operator which converts the crosscorrelation of the second seismogram and the reference seismogram into the autocorrelation of the reference seismogram,
    d. convolving the second seismogram with the operator, and
    e. repeating the sequence of steps presented above for each additional seismogram which is to be standardized.

3. A process performed with a computer without human intervention for improving seismic data whereby at least first, second, and third seismograms of interest are standardized to have the same generating wavelet comprising
    a. determining the autocorrelation of the first seismogram,
    b. determining the crosscorrelation of the second seismogram and the first seismogram,
    c. computing a first operator which converts the crosscorrelation of the second and first seismograms into the autocorrelation of the first seismogram,
    d. convolving the second seismogram with the first operator,
    e. determining the crosscorrelation of the third seismogram and the first seismogram,
    f. computing a second operator which convert the crosscorrelation of the third and first seismograms into the autocorrelation of the first seismogram,
    g. convolving the third seismogram with the second operator, and
    h. repeating the sequence of steps presented above for each additional seismogram which is to be standardized.

4. An automatic process performed on a digital computer for improving seismic data whereby at least first, second, and third seismograms of interest are standardized to have the same generating wavelet, comprising
    a. determining the autocorrelation of the first seismogram,
    b. determining the crosscorrelation of the second seismogram and the first seismogram,
    c. computing a first operator which converts the crosscorrelation of the second and first seismograms into the autocorrelation of the first seismogram,
    d. convolving the second seismogram with the first operator,
    e. determining the autocorrelation of the standardized second seismogram,
    f. determining the crosscorrelation of the third seismogram and the standardized second seismogram,
    g. computing a second operator which converts the crosscorrelation of the third and standardized second seismograms into the autocorrelation of the standardized second seismogram,
    h. convolving the third seismogram with the second operator, and
    i. repeating the sequence of steps presented above for each additional seismogram which is to be standardized.

5. A process performed using a properly programmed general purpose digital computer for improving seismic data whereby at least first, second, and third seismograms of interest are standardized to have the same generating wavelet comprising
    a. determining the autocorrelation of the first seismogram,
    b. determining the crosscorrelation of the second seismogram and the first seismogram,
    c. computing a first operator which converts the crosscorrelation of the second and first seismogram into the autocorrelation of the first seismogram,
    d. convolving the second seismogram with the first operator,
    e. combining the first seismogram and the standardized second seismogram to give a summation seismogram,
    f. determining the autocorrelation of the summation seismogram,
    g. determining the crosscorrelation of the third seismogram and the summation seismogram,
    h. computing a second operator which converts the crosscorrelation of the third and summation seismograms into the autocorrelation of the summation seismogram,
    i. convolving the third seismogram with the second operator, and
    j. repeating the sequence of steps presented above for each additional seismogram which is to be standardized.

* * * * *